United States Patent Office 2,863,427
Patented Dec. 9, 1958

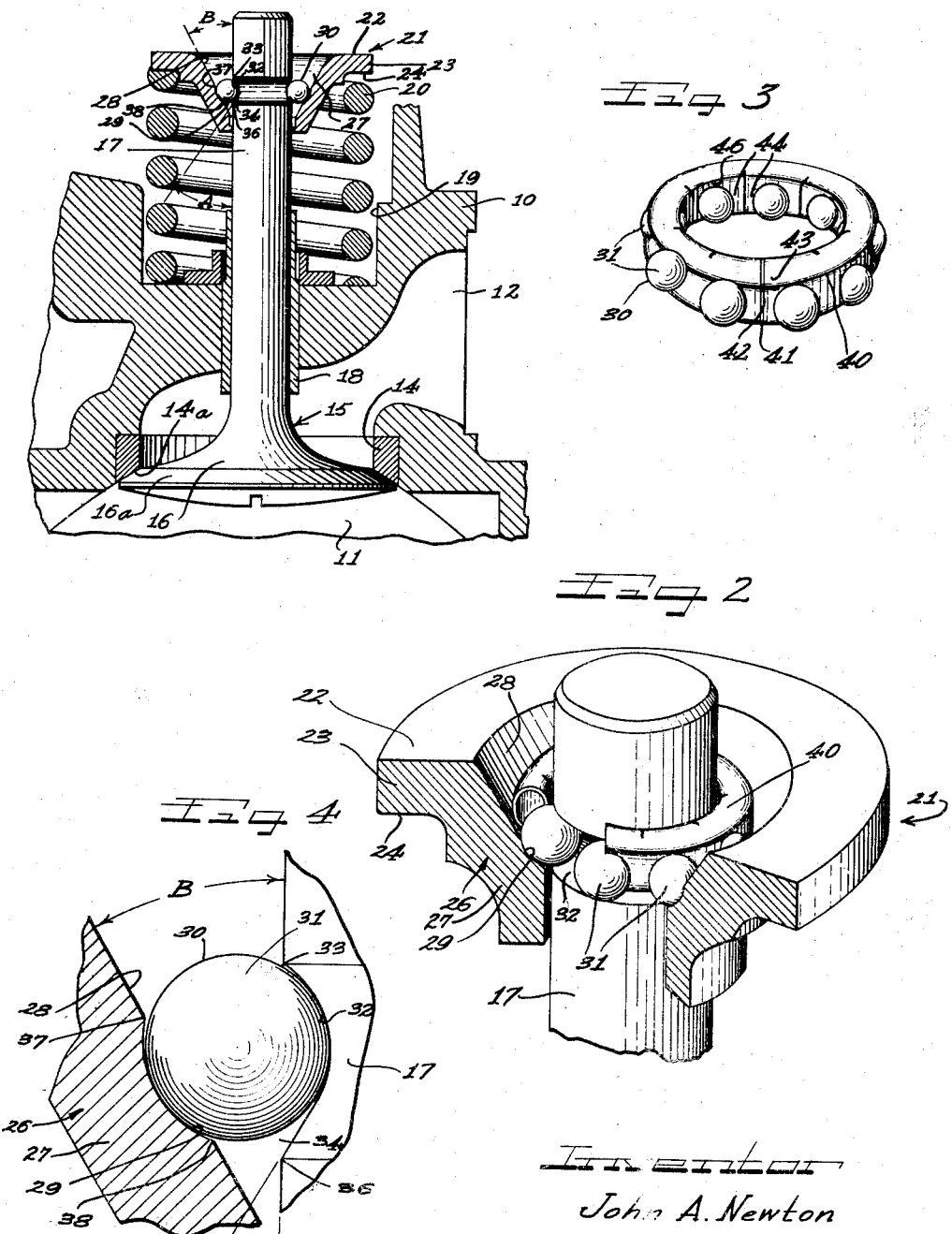

2,863,427

VALVE ROTATING DEVICE

John A. Newton, Painesville, Ohio, assignor to Thompson Products, Inc., Cleveland, Ohio, a corporation of Ohio Application May 27, 1954, Serial No. 432,684

15 Claims. (Cl. 123—90)

This invention relates generally to valve rotating devices and more particularly relates to a valve rotating device comprising inner and outer relatively rotatable parts with antifriction means interposed between the parts coupling the parts to one another against relative longitudinal displacement but accommodating relative rotative displacement.

In internal combustion engines poppet valve constructions are frequently employed. With such a construction, a valve member usually including a stem and a head is reciprocably mounted in an engine part, the head portion of the valve seating in a port to control the flow of fluid through the port.

Because of the temperatures generated and also because of the products of combustion which pass along the fluid flow path, the valve mechanism is subjected to an operating environment which produces an uneven wear between the valve seat and the valve head and builds up carbon deposits and other deleterious substances on the valve head.

In order to insure even wear and in order to minimize the build up of carbon or other substances on the valve head, it is desirable that the valve be incrementally rotated with respect to the engine part.

According to the principles of the present invention, the valve rotating device comprises inner and outer relatively rotatable parts which conveniently comprise the valve stem and a spring seating collar coupled together by antifriction means which are interposed between the parts so as to couple the parts against relative longitudinal displacement while accommodating relative rotative displacement. There is thus provided a low friction valve rotating device which allows turning of the valve as a result of normal engine vibration.

It is an object of the present invention, therefore, to provide a valve rotating device which has a reduced number of simplified elements.

Another object of the present invention is to provide a valve rotating device which is particularly characterized by its extreme simplicity and by the great economy with which it may be manufactured.

A further object of the present invention is to provide a valve rotating device which will facilitate turning of a poppet valve construction as a result of normal engine vibration.

A still further object of the invention is to provide a valve rotating device with minimum friction.

Yet another object of the present invention is to provide a device for effective relative rotation between valve parts subjected to changing loads.

Many other features, advantages and additional objects of the present invention will become manifest to those versed in the art upon making reference to the detailed description which follows and the accompanying sheets of drawings in which a preferred embodiment of a valve rotating device incorporating the principles of the present invention is shown by way of illustrative example.

On the drawings:

Figure 1 is a vertical cross-sectional view with parts in elevation of a poppet valve assembly equipped with a valve rotating device according to the present invention;

Figure 2 is an enlarged perspective view with parts broken away to illustrate additional details of construction of the valve rotating device provided in accordance with the principles of the present invention;

Figure 3 is a perspective view of the antifriction coupling means provided in accordance with the principles of the present invention;

Figure 4 is an enlarged fragmentary view of the valve rotating device shown in Figure 1.

As shown on the drawings:

In Figure 1, the reference numeral 10 is used to designate an engine part, such as, for example, a portion of the cylinder head of an internal combustion engine. The engine part 10 has a combustion chamber indicated at 11 and a port 12 through which the flow of fluid is regulated by a valving mechanism.

A seat ring 14 is secured in the mouth of the port 12 and has a beveled seating face 14a facing the combustion chamber 11.

A poppet valve 15 has a head portion 16 provided with a beveled seating face 16a coacting with the seat 14a of the ring 14. The valve 15 has a stem 17 slidably mounted in a stem guide sleeve 18 carried by the engine part 10. The stem guide sleeve 18 projects from the port 12 through a wall of the engine part 10 into a recess 19 in the engine part 10. A helical compression spring 20 is seated on the bottom of the recess 19 and the opposite end of the spring 20 is connected to the valve stem through a rotating device provided in accordance with the principles of the present invention and indicated generally by the reference numeral 21 in order to normally urge the stem in axial or longitudinal direction, thereby to close the valve in the port 12.

In accordance with the principles of the present invention, the spring 20 engages a spring seating collar indicated generally at 22, which member also constitutes an outer member in relation to the inner member provided by the valve stem 17, the spring seating collar 22 being circumjacent the valve stem 17.

The spring seating collar 22 has a circumferentially extending radially projecting wall portion or flange 23 providing on its bottom surface a radially projecting wall 24 which provides a spring seating surface for engaging the end coils on the coil spring 20.

The main body portion of the spring seating collar 22 is indicated at 26 and it will be noted that the body portion 26 is generally conical in configuration tapering inwardly at an offset angle relative to the flange 23 so as to converge to a reduced diameter neck 27 which is closely spaced to the peripheral surface of the valve stem 17.

Intermediate the upper and lower margins of a conical surface 28 provided on the inside of the body portion 26 there is formed a concentric annular groove 29. It may be noted that the walls of the grove are shaped to prescribe the contour of a curved surface, thereby to provide a smooth bearing surface which will be complementary to the spherical surface 30 formed on a plurality of antifriction members 31 taking the form, in this embodiment, of ball-type bearings or shiftable members.

On the valve stem 17 adjacent the end thereof and spaced to confront the groove 29, there is formed a concentric circumferentially extending annular recess 32. The groove 32 is shaped to provide a curved surface, the upper limit of the groove 32 being prescribed by an annular lip indicated at 33 lying on a predetermined radius of curvature.

The opposite side of the groove 32, however, is relieved as at 34 and terminates in an annular lip indicated at 36 lying on an offset planar surface which together with the upstanding side walls of the valve stem 17 prescribe an included angle indicated at A.

The upper and lower limits of the groove 29 in the body portion 26 of the spring seating collar 22 are indicated at 37 and 38, respectively. In a typical commercial installation, the tapered surface 28 of the body portion 26 is inclined at an angle indicated at B from a vertical axis corresponding to the center line axis of the valve stem 17 and the longitudinal axis of the spring seating collar 22, which angle would be approximately 30°. In such an installation, the angle A may also be approximately 30°. The depth of the grooves 29 and 32, or in other words, the extent of the radius of curvature of these two curved surfaces is approximately one-half of the diameter of the balls 31. Satisfactory operation is achieved if the curvature of the groove is approximately 50% to 53% of the ball diameter. Thus, the annular lip portions 33, 37 together form a restricted throat which is of smaller size than the diameter of the balls 31. It will be understood that the curved surface provided by the groove 32 is also complementary to the curved surface 30 on the balls 31 so that the balls 31 may be concurrently received and seated in each of the grooves 29 and 32.

With the arrangement thus described, the spring seating collar 22 is coupled to the valve stem 17 against relative longitudinal displacement, however, the shiftable balls 31 accommodate relative rotative displacement between the spring seating collar 22 and the valve stem 17.

In order to retain a plurality of balls 31 in circumferentially spaced relation interposed between the inner and outer parts 17 and 22, a ball bearing retaining cage 40 is provided. The cage 40 may conveniently comprise a sheet form blank which is bent and shaped into a substantially annular form having a split portion 41 between opposite ends 42 and 43 and providing a plurality of circumferentially spaced fingers 44 each apertured as at 46 to rotatably retain one of the balls 31. Other forms of cages can be effectively employed, for example, a one piece integral design.

As shown in Figure 4, both of the relatively rotatable parts are provided with circumferentially continuous grooves providing a trackway surface for a plurality of anti-friction balls circumferentially spaced for movement between the parts. The valve spring sealing collar indicated at 22 has point contact with the balls 31 as does the valve stem 17, thereby insuring an anti-friction connection between the parts with a resulting planetary action between the inner and outer parts of the anti-friction means.

The cage 40 is so constructed that the balls 31 will not fall out although the balls are allowed to move radially outwardly as the ball bearing unit is placed over the valve stem, at which time the balls 31 are contained in the valve stem groove 32 by the spring retainer.

It will be appreciated that the ball contact with the stem and the collar may be either point or line contact depending on the radius of curvature.

When assembled, the balls 31 retained by the cage 40 are further confined in the grooves 29 and 32 thereby to preclude relative axial or longitudinal displacement of the inner and outer parts. Because the valve rotating device 21 is a low friction device utilizing the anti-friction elements 31, the changing loads exerted upon the valve by the alternate compression and release of the spring 20 will permit relative rotation between the inner and outer parts during normal engine operation. Moreover, normal engine vibration will allow turning of the valve relative to the engine part, thereby insuring even wear and minimizing the deposit of carbon and other deleterious substances on the valve head and valve seat. Rotation of the valve will also be induced by the flow of gas past the valve.

For best results, the valve stem 17 is made from a ferritic steel material having a hardness range of 40–68 Rockwell "C." The curvature of groove 32 should be maintained in proportion to the size of the balls, for example, as pointed out above to 50% to 53% of ball diameter. The valve stem 17 can also be conveniently made from an austenitic material which has been work hardened to give a hardness range of 40–68 Rockwell "C." By adhering to this range of hardness and size proportion, local permanent deformation such as might interfere with smooth bearing operation is avoided.

Although various minor modifications might be suggested by those versed in the art, it should be understood that I wish to embody within the scope of the patent warranted hereon all such modifications as reasonably and properly come within the scope of my contribution to the art.

I claim as my invention:

1. A valve rotating device consisting of a valve stem, a valve spring collar concentrically disposed relative to said valve stem and antifriction means interposed between and engaging said stem and said collar at adjoining confronting portions of said stem and said collar, said antifriction means together with said confronting portions coupling said stem and said collar to one another for unison longitudinal displacement when assembled and accommodating relative rotative displacement between said stem and said collar during the valve operating cycle.

2. A valve rotating device comprising, a valve stem reciprocably mounted in an engine part, a collar surrounding said stem and having a radially outwardly projecting spring seating surface for bottoming one end of a valve spring, and shiftable members engaging intermediate portions of said stem and said collar and coupling said stem and said collar for relative rotative movement, said shiftable members together with said intermediate portions locking said stem and said collar for unison longitudinal displacement when assembled.

3. A poppet valve comprising an inner stem and an outer spring-seating collar, respectively, and intermediate shiftable antifriction members engaging and coupling said spring and said collar for relative rotation while insuring unison longitudinal displacement of said spring and said collar when assembled.

4. A device for effecting relative rotation between two reciprocating valve parts subjected to changing loads which comprises, a valve having a stem formed with a first annular groove in the peripheral surface thereof adjacent one end, a valve spring seating collar circumjacent said stem and having means providing a second annular groove concentrically confronting said first annular groove, and shiftable means between said grooves retaining said stem and said collar for unison longitudinal movement when assembled, said shiftable means comprising antifriction members, thereby to accommodate relative rotation between the parts.

5. A device for effecting relative rotation between two movable valve parts subjected to changing loads which comprises, a valve having a stem formed with a first annular groove in the peripheral surface thereof adjacent one end, a spring seating collar concentrically outwardly and circumjacent said stem, said collar having a radially outwardly projecting flange providing a valve spring seating surface and having a longitudinally extending body portion providing a second concentric circumferentially extending groove confronting said first groove, and balls between said grooves retaining said parts for unison longitudinal movement when assembled and consisting of antifriction members for accommodating relative rotation between the parts.

6. A valve rotating device comprising, a reciprocably movable valve stem, a spring seating collar circumjacent thereto, inner and outer concentric confronting surfaces provided by said stem and said collar, antifriction bearings between said surfaces, and recess means formed in said surfaces complementary in shape to said bearings to receive and confine said antifriction bearings for rotatably coupling said stem to said collar for unison reciprocable movement.

7. A valve rotating device comprising, a reciprocably movable valve stem, a spring seating collar circumjacent thereto, inner and outer concentric confronting surfaces provided by said stem and said collar, antifriction bearings between said surfaces, and recess means formed in said surfaces complementary in shape to said bearings to receive and confine said antifriction bearings for rotatably coupling said stem to said collar for unison reciprocable movement, said recess means comprising concentric annular circumferentially continuous grooves in both surfaces.

8. A valve rotating device comprising, a reciprocably movable valve stem, a spring seating collar circumjacent thereto, inner and outer concentric confronting surfaces provided by said stem and said collar, antifriction bearings between said surfaces, and recess means formed in said surfaces complementary in shape to said bearings to receive and confine said antifriction bearings for rotatably coupling said stem to said collar for unison reciprocable movement, and a bearing retaining cage for said bearings keeping said bearings in circumferentially spaced relation between said confronting surfaces.

9. A valve rotating device comprising inner and outer moving and stationary parts providing spaced confronting concentric surfaces and consisting of a valve stem and a spring seating collar member, respectively, and rolling members inserted between said surfaces locking said stem and said collar member for unison axial movement when assembled and each having rolling contact with each of said surfaces.

10. A valve rotating device comprising inner and outer moving and stationary parts providing spaced confronting concentric surfaces and consisting of a valve stem and a spring seating collar member, respectively, and rolling members inserted between said surfaces each having rolling contact with each of said surfaces, said rolling members constituting balls, at least one of said surfaces having a curved annular groove receiving said balls and said groove having a curvature of 50%–53% of the ball diameter, said rolling members and said grooves together retaining said stem and said collar member in assembly for unison axial movement when assembled.

11. A valve rotating device comprising inner and outer moving and stationary parts providing spaced confronting concentric surfaces and consisting of a valve stem and a spring seating collar member, respectively, and rolling members inserted between said surfaces locking said retainer and said collar member for unison axial movement when assembled and each having rolling contact with each of said surfaces, said valve stem being made of a ferritic steel having a hardness range of 40–68 Rockwell "C."

12. A valve rotating device comprising inner and outer moving and stationary parts providing spaced confronting concentric surfaces and consisting of a valve stem and a spring seating collar member, respectively, and rolling members inserted between said surfaces locking said stem and said collar member for unison reciprocable movement and each having rolling contact with each of said surfaces, said valve stem being made of austenitic material work-hardened to a hardness range of 40–68 Rockwell "C."

13. A valve rotating device comprising inner and outer moving and stationary parts providing concentric surfaces and consisting of a valve stem and a spring seating collar member, respectively, and rolling members inserted between said surfaces each having rolling contact with each of said surfaces, and a cage for said rolling members constructed to retain a plurality of rolling members in circumferentially spaced alignment, said cage having means confining said rolling members for limited radial movement, said rolling members being movable radially outwardly sufficiently to telescope over said stem and being thereafter movable radially inwardly into engagement with said surface provided by said stem to retain said stem and said collar member in assembly for unison reciprocation with one another.

14. A valve rotating device comprising inner and outer moving and stationary parts providing concentric surfaces and consisting of a valve stem and a spring seating collar member, respectively, and rolling members inserted between said surfaces each having rolling contact with each of said surfaces, and a cage for said rolling members constructed to retain a plurality of rolling members in circumferentially spaced alignment, said cage having means confining said rolling members for limited radial movement, said rolling members being movable radially outwardly sufficiently to telescope over said stem and being thereafter movable radially inwardly into engagement with said surface provided by said stem to retain said stem and said collar member in assembly for unison reciprocation with one another, said cage consisting of a sheet-form member bent to an annular shape and having a split portion between opposite ends thereof.

15. A valve rotating device comprising, a valve stem, a spring seating collar circumjacent thereto, an annular outer surface provided by said collar tapered to converge from a spring seating flange radially inwardly to said stem, and an annular cylindrical inner surface provided by said stem, said inner and outer surfaces confronting one another, a plurality of circumferentially spaced antifriction ball bearings between said surfaces, and curved recesses formed in said surfaces to a depth less than the diameter of said balls and complementary in shape to the peripheral surface of said balls, at least one of said surfaces having the recess therein formed as a circumferentially continuous concentric annular groove to accommodate rotation between the stem and the collar, said ball bearings and said recesses together forming a coupling joint retaining said collar and said stem in assembly for unison reciprocation with one another when assembled.

References Cited in the file of this patent

UNITED STATES PATENTS

| | | |
|---|---|---|
| 822,723 | Conrad | June 5, 1906 |
| 979,068 | Gibbs | Dec. 20, 1910 |
| 1,176,455 | Hughes | Mar. 21, 1916 |
| 1,513,075 | Trembley | Oct. 28, 1924 |
| 1,926,999 | Keller | Sept. 12, 1933 |
| 2,157,101 | Smith | May 9, 1939 |

FOREIGN PATENTS

| | | |
|---|---|---|
| 165,516 | Great Britain | June 27, 1921 |